United States Patent [19]

Rosan, Jr.

[11] Patent Number: 4,568,228
[45] Date of Patent: Feb. 4, 1986

[54] FASTENER WITH ATTACHED LOCK RING

[75] Inventor: Jose Rosan, Jr., Newport Beach, Calif.

[73] Assignee: Rexnord Inc., Brookfield, Wis.

[21] Appl. No.: 693,921

[22] Filed: Feb. 28, 1985

Related U.S. Application Data

[63] Continuation of Ser. No. 387,702, Jun. 11, 1982, abandoned.

[51] Int. Cl.$^4$ ............................................. F16B 37/12
[52] U.S. Cl. .................................. 411/178; 411/109; 411/968
[58] Field of Search ............................. 411/177–179, 411/373, 180, 181, 103, 107, 109

[56] References Cited

U.S. PATENT DOCUMENTS

| | | |
|---|---|---|
| 2,400,318 | 5/1946 | Rosan . |
| 2,822,014 | 2/1958 | Cummaro . |
| 2,849,046 | 8/1958 | Cummaro . |
| 3,124,189 | 3/1964 | Dietlein . |
| 3,179,144 | 4/1965 | Brown . |
| 3,215,183 | 11/1965 | Dietlein . |
| 3,259,163 | 7/1966 | Rosan et al. . |
| 3,281,173 | 10/1966 | Rosan . |
| 3,454,072 | 7/1969 | Dietlein . |
| 4,067,371 | 1/1978 | Stencel . |

*Primary Examiner*—Robert L. Wolfe
*Assistant Examiner*—Neill Wilson

[57] ABSTRACT

A lock ring and fastener which is manufactured with the lock ring connected thereto by metal tabs or a metal strip of the same parent material as the fastener. It is intended to be installed in a threaded bore of a workpiece as an insert or stud.

The lock ring is displaced and the metal tabs or strip is broken by a special installation tool. This tool flattens any rough edges that remain on the insert or stud after installation. The internal grooves of the lock ring engage the external teeth of the insert or stud. The external teeth of the lock ring bite into the workpiece and by coacting with the external teeth of the insert or stud assist in preventing rotation of the insert or stud in the workpiece.

2 Claims, 4 Drawing Figures

FASTENER WITH ATTACHED LOCK RING

This application is a continuation of application Ser. No. 387,702, filed June 11, 1982, now abandoned.

BACKGROUND OF THE INVENTION

The present invention relates to fasteners in general and more particularly to fasteners with lock rings that are permanently installed in a workpiece and which typically cooperate with another fastener to hold objects to the workpiece. An example would be an insert or stud.

Inserts installed in a workpiece provide a means of attachment of an object to the workpiece. Inserts are used when the stress requirements are greater than are provided by the workpiece. An insert can distribute the stress over a much greater area and can be harder material than would be provided by the workpiece alone. An example of an insert is a plug-like object having external threads to bite into or cooperate with the workpiece material. The insert also has internal threads for receiving the male threads of a cooperating piece.

Studs in contrast provide an anchor for attachment of objects to a workpiece. A stud secures to a workpiece with male threads and itself provides male threads for cooperation with a female threaded nut or other fastening means.

Obviously, separation of the fasteners from the workpiece is not desired. The threads of the insert and stud can be of hardened material, much harder than the workpiece. It is not uncommon to also provide against the backing out of the threads due to vibration.

The action used may often entail keeping track of separate lock rings which bite into the workpiece and by coacting with the insert or stud and the workpiece they prevent rotational movement.

A patent search of the prior art discloses no invention similar to the present discovery. While U.S. Pat. Nos. 2,822,014; 2,849,046; 3,215,183; 3,454,072 and 4,067,371 disclose fasteners with locking rings none of them disclose a locking ring permanently attached to the fastening means and made of the same material during the manufacture of the fastening means. None further discloses a fastening means that is not completed until the lock ring and fastening means are manufactured.

SUMMARY OF THE INVENTION

The present invention provides a combination stud or insert with the lock ring connected by metal tabs or a metal strip, of the same material as the stud or insert, that is broken upon installation of the lock ring into the workpiece. A special tool is used for installation of the lock ring. The lock ring, after being broken from the stud or insert, rotationally couples to the balance of the fastener through meshing of the internal teeth of the lock ring and the external teeth of the fastener. The rough edges of the metal tabs or strip are shattered during installation.

The mode illustrated contemplates an insert or stud externally threaded for threaded receipt in the workpiece. The insert has a lock ring on one end which faces outward from the workpiece. This is formed when the insert is manufactured The external threads of the insert are formed afterwards. The lock ring is connected to the insert by small metal tabs or a metal strip of the same material as the insert is made of, which is broken during installation of the lock ring.

The studs are manufactured similarly. The lock ring is first formed as attached to the center of the stud with metal tabs or a metal strip. Both the tabs and strip are formed of the same parent material as the stud. Different threads are then formed on the top and bottom shanks of the stud.

Thus it can be seen that is is a primary object of this invention to keep the lock ring and insert or stud together until the lock ring is installed in the workpiece. Lost, broken or misshaped lock rings are, because of this invention, a thing of the past.

These and other features, aspects and advantages of the present invention will become apparent from the appended drawings.

DESCRIPTION OF THE PREFERRED EMBODIMENT

Figure 1:
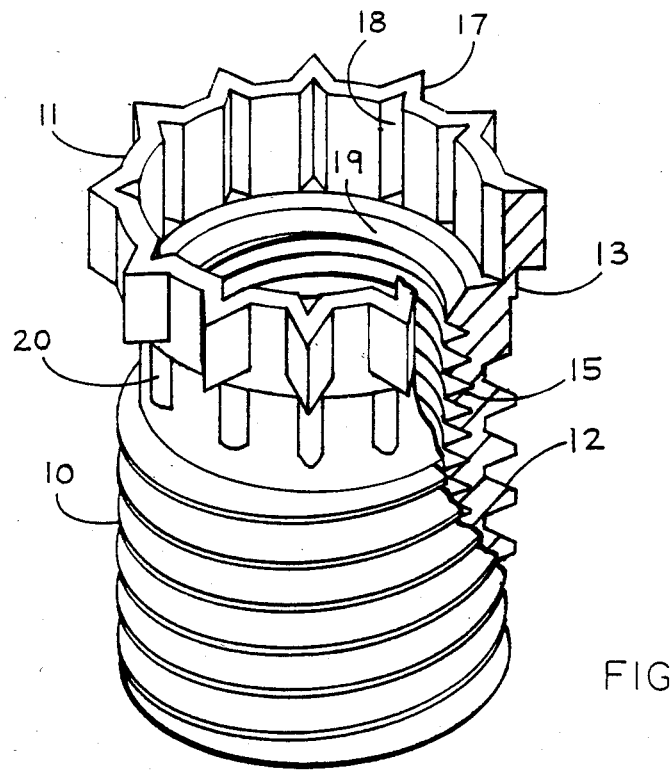
FIG. 1 is a perspective view partly in section of the insert and lock ring as manufactured.
Figure 2:
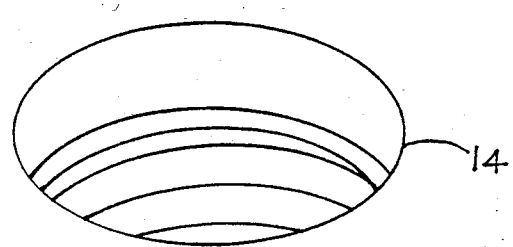
FIG. 2 is a cross-sectional view of the insert and lock ring installed in a workpiece.
Figure 2:
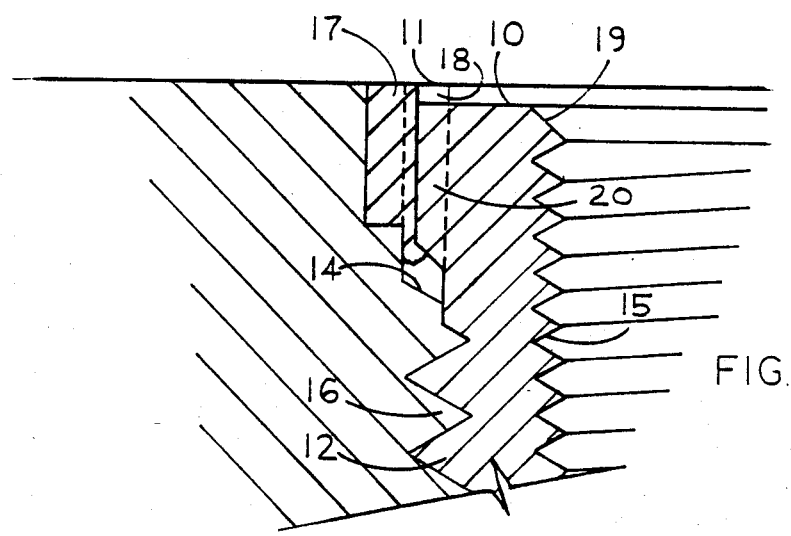

With reference to FIGS. 1 and 2 an insert body 10 of the present invention has a connected lock ring 11. The insert has external threads 12 running down its length. Metal tabs 13 or a metal strip (not shown) of the same parent material as the insert hold the lock ring 11 to the insert 10 prior to installation. A bore 14 in the workpiece is tapped with internal threads 16 to receive the insert. The insert 10 is also internally threaded at 15 with a pilot or champher 19 that guides a male threaded fastener (not shown) into the insert. The lock ring 11 has external teeth or serrations 17 that bite or swage their way into the workpiece upon installation. Internal grooves 18 of the lock ring cooperately engage with external teeth 20 of the insert after the metal tabs 13 or the metal strip is broken and the lock ring 11 installed in the workpiece. This is illustrated in FIG. 2. The internal grooves may be the shape shown or any geometric shape as design may dictate.

The metal tabs 13 are composed of thin parent metal left behind during the formation of the insert and lock ring. The major diameter of the external tooth 20 of the insert 10 does not exceed the inside diameter of lock ring 11 i.e., the major diameter of the internal grooves 18 so that no difficulty is experienced installing the lock ring 11 upon the insert 10. The external teeth 17 on lock ring 11 are angled to facilitate entrance into the workpiece. Interior grooves 18 are in this mode 90° typically and accomodate the external teeth 20 of the insert. When installed the lock ring 11 is rotationally coupled with the workpiece 21 and insert 10 so that the insert 10 cannot rotate.

Figure 3:
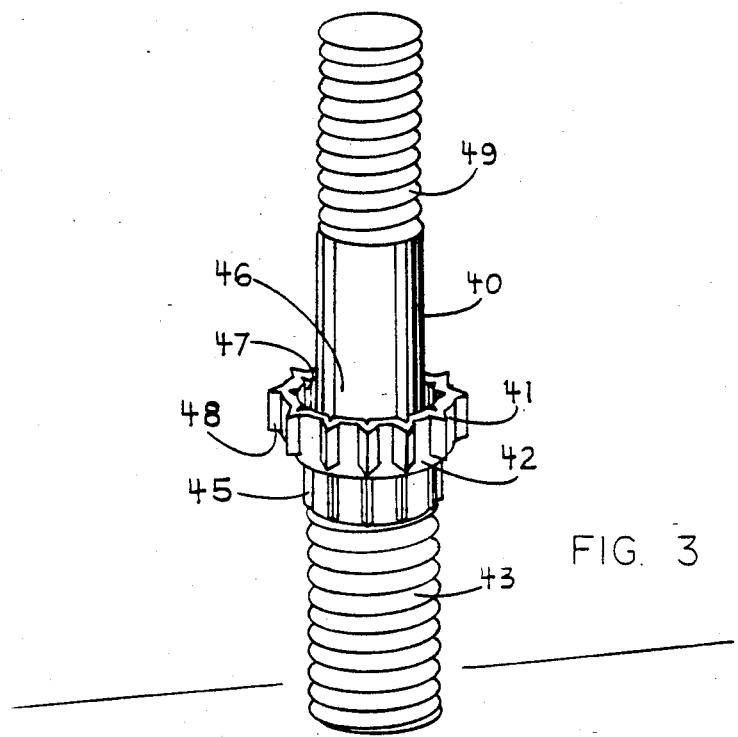
FIG. 3 is a perspective of a stud and lock ring as manufactured.
Figure 4:
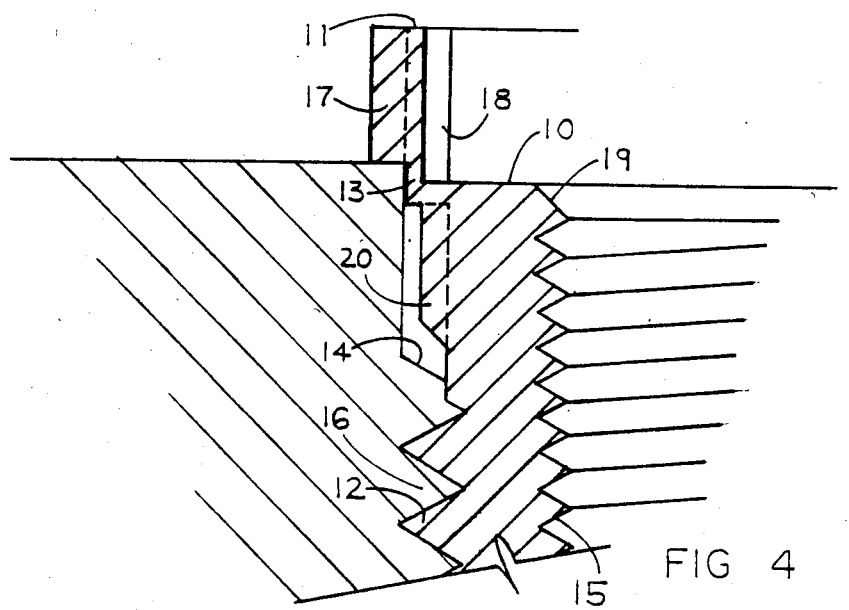
FIG. 4 is a cross-sectional view of the insert and lock ring shown in FIG. 1 illustrating the matching internal grooves of the lock ring and external teeth of the insert and the tabs that hold the lock ring until broken during installation.

FIG. 3 illustrates a stud 40 with the lock ring 41 held in place by metal tabs 42 or a metal strip (not shown), of the same parent material as the metal stud. The upper and lower portion 49 and 43 respectively is covered with threads which may be of a different size. During the installation the lower portion is rotated into the workpiece 44 that has had a bore cut and threaded to accomodate the stud 40. The lock ring 41 is then displaced using a special took (not shown). The lock ring 41 has internal teeth of splines 47 that coact or mesh with external teeth 45 that ring the center section 46 of the stud. These grooves may be of any geometric design besides the mode illustrated. The lock ring 41 is anchored by the workpiece material 44 which it swages or bites into with its external teeth 48 when forced into the workpiece during installation. The lock ring 41 thus prevents rotation of the stud 40, after being installed in the workpiece. The upper thread 49 of the stud which may be a different size from the lower thread 43 is rolled on after the lock ring 41 is formed.

Having illustrated and described preferred embodiments of the invention, it should be apparent to those skilled in the art that the invention admits to modification in arrangements and details. I claim as my invention all such modifications, as come within the true spirit and scope of the attached claims.

I claim:

1. A one-piece insert having a body portion formed integral with a lock ring portion and interconnecting strip means formed therebetween, with said body portion being in continuous, cooperative engagement with said lock ring portion, and having a top surface, a threaded external surface adapted for securement in a tapped hole in a workpiece, and a serrated portion intermediate said top surface and said threaded external surface, said serrated portion having a straight cylindrical exterior surface extending axially the entire length thereof, and a plurality of angularly spaced, axially extending teeth projecting radially outward from said exterior surface and extending up to said strip means, said lock ring portion being integrally connected to said body portion top surface by said interconnecting strip means and having an external surface, a plurality of radial teeth projecting from said external cylindrical surface, a straight cylindrical inner wall, and a plurality of radial grooves on said inner wall, each of said grooves extending to said strip means and being of substantially equal length to and in continuous axial alignment with one of said teeth on said body serrated portion, said lock ring portion being axially displaceable at said interconnecting strip means with respect to, for meshing engagement with, said body portion and being formed from the same parent material as said body portion.

2. The insert of claim 1 wherein said insert body teeth have a major diameter and said lock ring portion grooves have a major diameter, with said insert body teeth major diameter being less than or equal to said major diameter of said lock ring portion grooves.

* * * * *